Feb. 7, 1967  R. R. WEDDE  3,302,387
TIME CONVERSION MAP
Filed Aug. 26, 1965  4 Sheets-Sheet 1
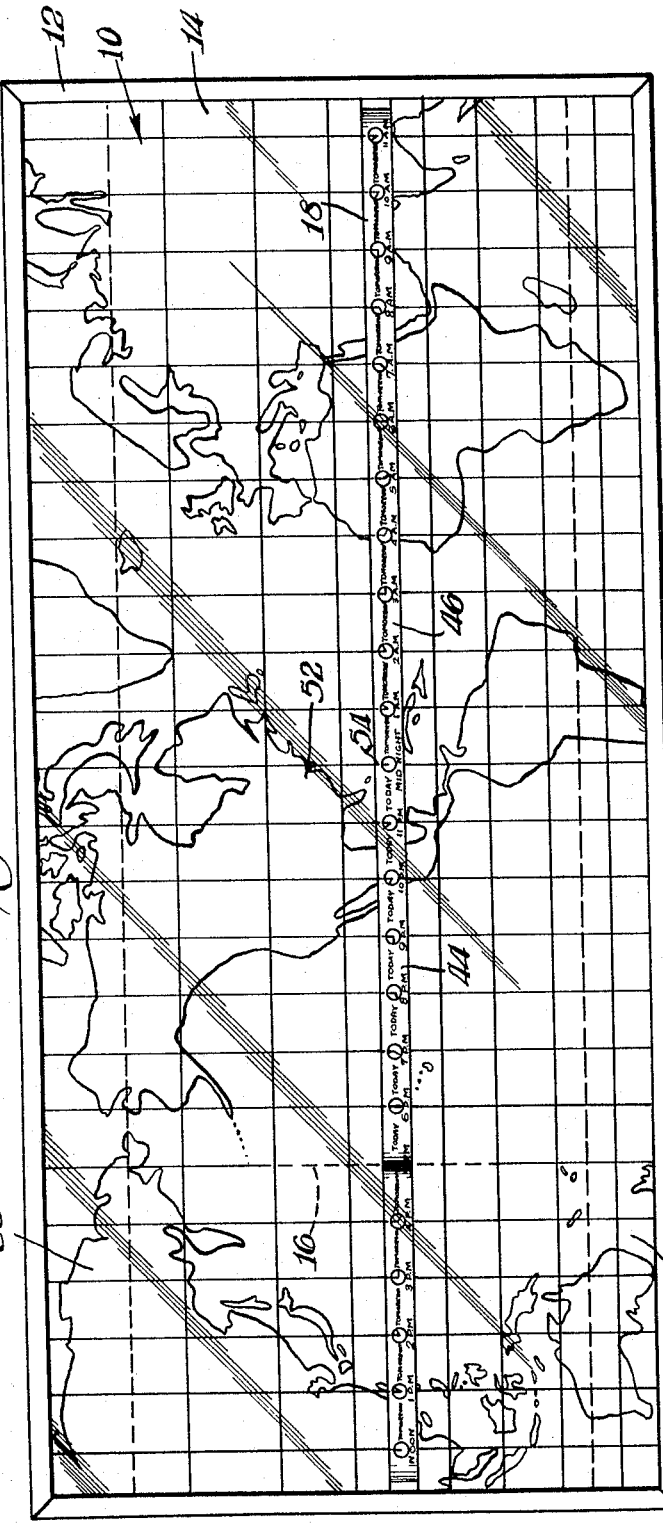
INVENTOR
Robert R. Wedde
BY Connolly and Hutz
ATTORNEYS

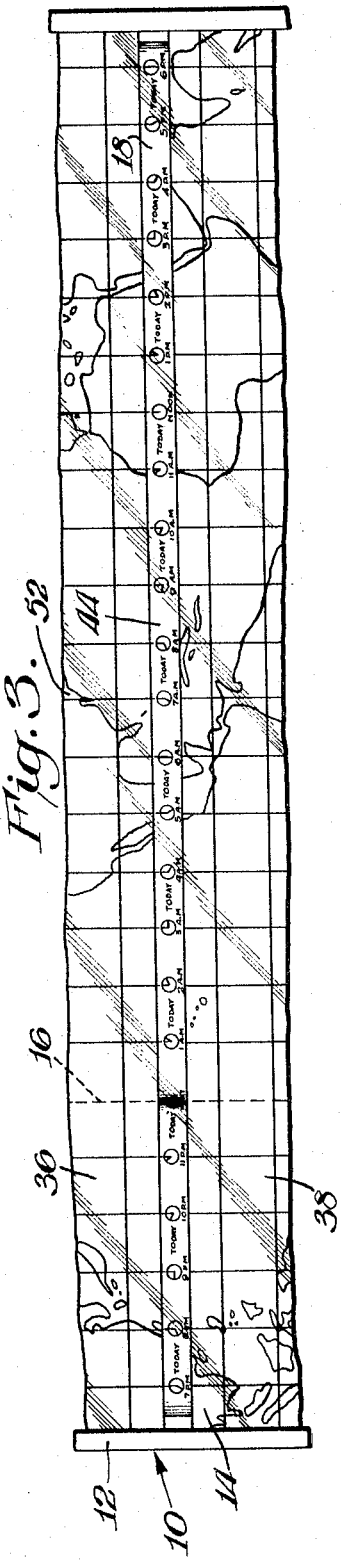
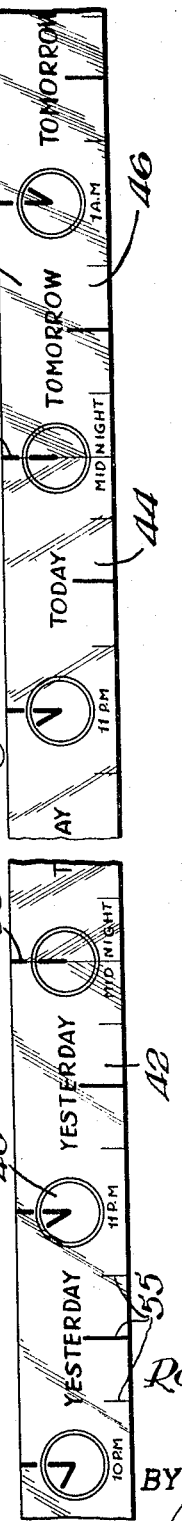
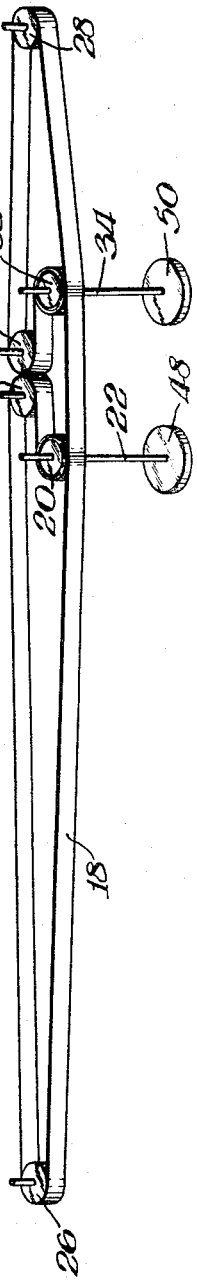

Feb. 7, 1967 R. R. WEDDE 3,302,387
TIME CONVERSION MAP
Filed Aug. 26, 1965 4 Sheets-Sheet 3
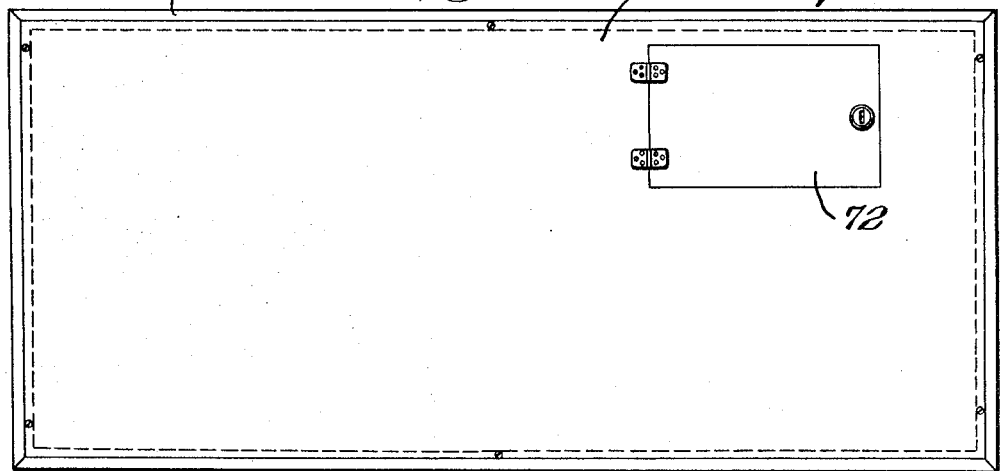
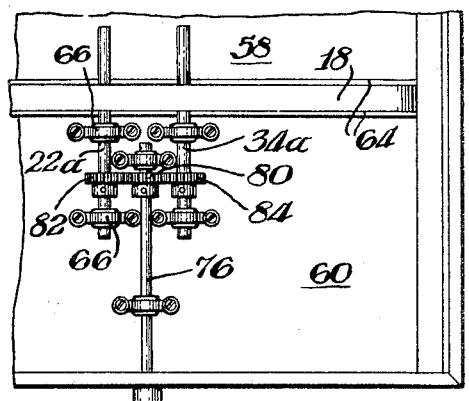
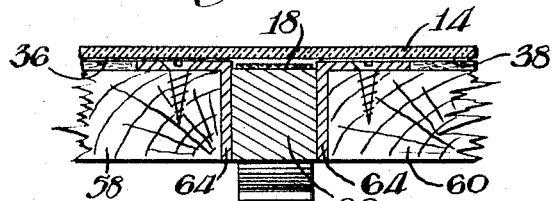
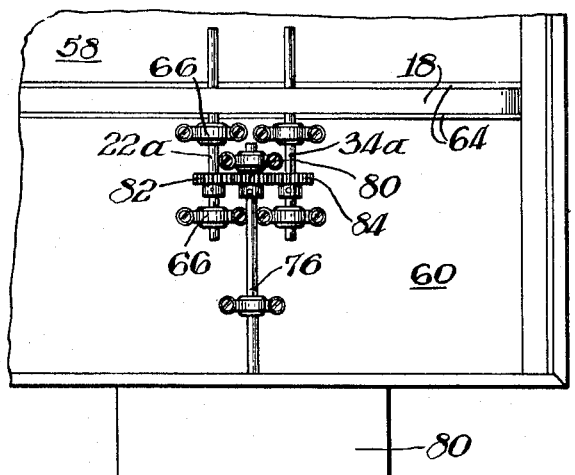
INVENTOR
Robert R. Wedde
BY Connolly and Hutz
ATTORNEYS Feb. 7, 1967   R. R. WEDDE   3,302,387
TIME CONVERSION MAP
Filed Aug. 26, 1965   4 Sheets-Sheet 4
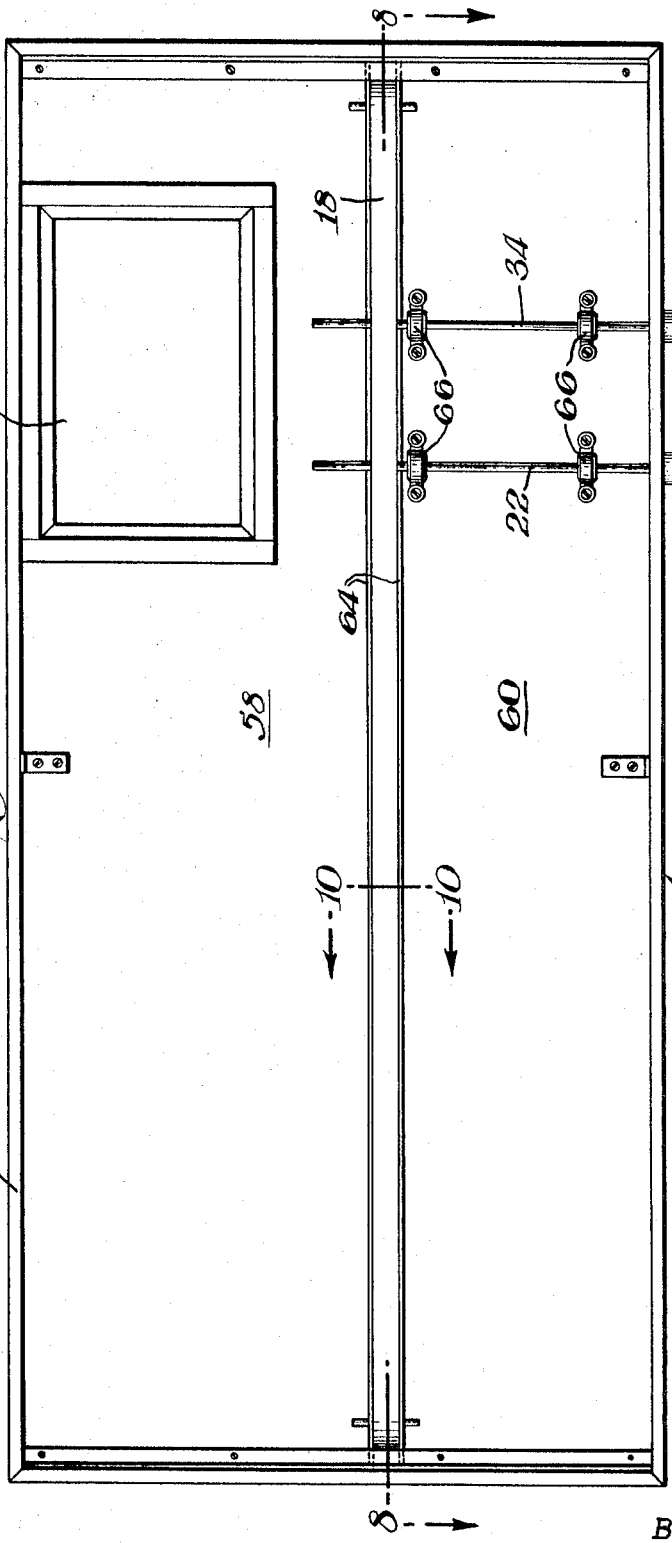
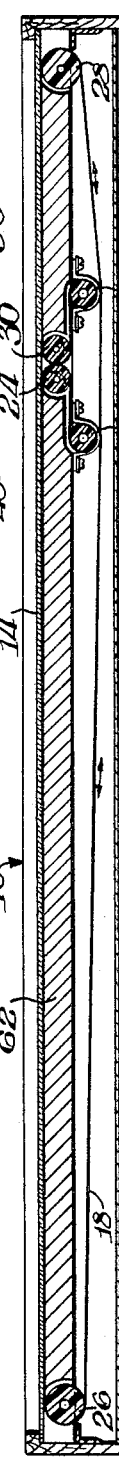
INVENTOR
*Robert R. Wedde*
BY *Connolly and Hutz*
ATTORNEYS

United States Patent Office 3,302,387
Patented Feb. 7, 1967

3,302,387
TIME CONVERSION MAP
Robert R. Wedde, 631 Lakewood Place,
Dover, Del. 19901
Filed Aug. 26, 1965, Ser. No. 482,754
9 Claims. (Cl. 58—42.5)

This invention relates to a time conversion map which is particularly adaptable for educational and demonstrative purposes as well as a map which can be used for informative purposes in airports and for ham-operators.

Present maps include various indicia at each time zone or 15° longitude to indicate the relative difference in time at different locations of the world. It is quite beneficial however that such maps incorporate a timing device which can be manipulated to indicate the actual time at a particular location regardless of the hour of day. Such devices are available in the form of for example, rotatable time rings on globes. The use of these devices are disadvantageous however since with a globe the entire world cannot be seen at a single glance as is possible with flat maps. Accordingly, there is a definite demand for such an adjustable time indication device for use with a flat map so that the time at a particular location can be adjustable to accurately indicate the particular hour of the day and such indication will automatically convert corresponding times at all locations of the world so that these corresponding times can be seen at a glance. Such a device would be particularly useful in for example schools as an educational device to demonstrate how the changes in time at one location correspond to other changes in time at different locations throughout the world.

In addition, such a device would also be useful at airports to supplement or replace the present arrangement of various clocks for indicating time at different parts of the world. Moreover, this type of device would also be useful to ham operators who are interested in knowing the corresponding time at locations of fellow ham operators.

An object of this invention is to provide a time conversion device which is readily adaptable for use with a flat map for educational purposes, as an informative device, for use in airports, and for ham operators and the like.

A further object is to provide such a device which is adaptable for use in any part of the world.

In accordance with this invention, the time conversion device includes a movable band having time indicia thereon which corresponds to each time zone. The band is mounted on a flat map in such a manner that it enters the front of the map at the international dateline. The band may extend across the front of the map to its eastern end, then completely around the back of the map to the western end, and finally across the front of the map to the international dateline. When it is desired to determine the time at any part of the world for a particular location, the band is manipulated to indicate the present or desired time at that location. By orienting or basing the band at the international dateline, the band becomes automatically adapted to indicate the corresponding times at any part of the world. By making the band long enough to include a full 24 hours of what would correspond to today as well as a full 24 hours of yesterday and tomorrow, the band is useable at any part of the world. Advantageously, the days may be printed in contrasting colors to clearly indicate when one day ends and the subsequent begins.

A clock or timing mechanism may be associated with the band for automatically moving the band to indicate the time of day at a particular location. This arrangement is particularly adaptable for use in airports or by ham operators. Conveniently, the indicia on the band may be made luminous for use in dimly lit rooms.

The map may be divided into a northern portion and a southern portion with the band riding on a track between these portions so that the band can be freely visible with respect to most portions of the world. Advantageously, the track also serves as a spacer between these portions.

Novel features and advantages of the present invention will become apparent to one skilled in the art from a reading of the following description in conjunction with the accompanying drawings wherein similar reference characters refer to similar parts and in which:

FIG. 1 is a top plan view of one embodiment of this invention;

FIGS. 2–3 are plan views of a portion of the embodiment shown in FIG. 1 in different phases of operation;

FIG. 4 is a plan view of fragments of the band shown in FIGS. 1–3;

FIG. 5 is a plan view of one type of band useable in the embodiment of the invention shown in FIGS. 1–4;

FIG. 6 is a bottom plan view of the embodiment of the invention shown in FIG. 1;

FIG. 7 is a bottom plan view of the embodiment of the invention shown in FIGS. 1 and 6 with the housing back removed;

FIG. 8 is a cross sectional view in elevation taken through FIG. 7 along the line 8—8;

FIG. 9 is a perspective view of the drive mechanism for the band shown in FIG. 8;

FIG. 10 is a cross sectional view taken through FIG. 7 along the line 10—10;

FIG. 11 is a plan view of a modified form of drive for the embodiment of the invention shown in FIGS. 1–10; and FIG. 12 is a plan view similar to FIG. 11 of still another form of this invention;

FIG. 1 illustrates a flat map 10 mounted in housing 12 under a transparent glass or Plexiglas shield 14. The map indicated in FIG. 1 is substantially conventional in which there is a different time zone for every 15° longitude and which also includes the international dateline 16. The time at various locations of the world is indicated on the conversion band 18 which is oriented or based at the international dateline as later described.

As most clearly shown in FIGS. 8–9, band 18 is secured at one end to roller 20 on shaft 22. The band is then wrapped around take-up roller 24 where it enters the front of the map at the international dateline 16. Band 18 then extends from international dateline 16 completely across the map to its eastern end over roller 26 and then completely across the back of the map over roller 28 at the western end of the map. Band 18 then extends across the western end of the map to the international dateline 16 where it is wrapped around roller 30 and its end is secured on roller 32 mounted on shaft 34.

Advantageously, the map is divided into a northern section 36 and a southern section 38 with the band 18 conveniently arranged between these sections so that the band is disposed near substantially any location on the map.

As most clearly indicated in FIG. 4 band 18 includes indicia thereon to indicate a particular time of day. Conveniently, these indicia comprise a clock 40 in which the minute hand is aligned vertically with respect to the various lines of longitude. Additionally, the numerical time is also indicated under each clock indicia while the particular day (i.e. yesterday 42, today 44, and tomorrow 46) is indicated between the clocks. The days are also contrastingly colored in for example green and yellow and red so that it is clearly apparent at a glance from a distance where one day begins and another day ends.

A knob or handle 48 is secured to the end of shaft 22 with a similar knob 50 secured to shaft 34. Rotation of these knobs results in changing the position of tape or band 18 with respect to the map. By making the band 18 at least three full days long as indicated in FIG. 5, the band 18 can be used in any place of the world. For example, FIG. 1 shows use of the map to indicate the present time (today) at a location between international dateline 16 and time zone 52. At that particular time tomorrow has already begun for the rest of the world. As time increases the tape or band 18 is rotated so that the midnight indicia 54 moves westward toward international dateline 16. Shortly before midnight indicia 54 reaches international dateline 16 only an hour or less is left in the time zone immediately to the east of international dateline 16 while substantialy 24 hours of tomorrow is indicated throughout the remainder of the world.

FIG. 2 shows another situation in which three time zones immediately to the east of international dateline 16 are living in "yesterday" with respect to a particular present time in any other part of the world. When the midnight indicia 56 between yesterday and today (FIG. 4) is in the time zone immediately west of international dateline 16 an hour or less of present (today) time exists in that zone while the rest of the world is in "yesterday."

FIG. 3 illustrates the situation where the midnight indicia 54 and 56 are at the international dateline 16 so that the entire world of all 24 time zones has a "today" time.

Accordingly, since there are 24 time zones, by making band 18 at least three full days long, the time conversion device can be utilized to indicate the time at any part of the world at any time of day in any type of situation.

The time conversion device of this invention is particularly suitable for educational purposes. By manipulating the contrastingly colored band or tape 18, a child can clearly comprehend how time advances as it moves toward the international dateline.

In an advantageous form of this invention northern section 36 of the map is secured to support plate 58, while southern section 38 is secured to support plate 60 as show for example in FIG. 10. Plates 58 and 60 are spaced from each other by track 62. A pair of L-shaped rails 64 are secured to the sides of track 62 and then fastened to plates 58 and 60 so that in effect the device includes three parts: plates 58 and 60 and their map sections and track 62 with band or tape and its drive device. (Track 62 and rails 64 may, of course, be made of one-piece construction.) As also indicated in FIG. 10 the bottom or back of track 62 is flush with support plates 58 and 60. The top however is spaced slightly inwardly so that band 18 has sufficient space between its track 62 and shield 14.

Referring now to FIG. 7 shafts 22 and 34 are secured in bearings 66 on support plates 60 in such a manner that rollers 24 and 30 are disposed under international dateline 16. Track 62 is slotted at that point by for example forming track 62 of two separate pieces to permit band 18 to enter and leave the front of the map at the international dateline. The entire unit is mounted in sides 68 of housing 12 which includes a compartment 70 for the storage of for example a manual indicating how the device should be operated or for the storage of any other desired objects. Compartment 70 is closed and locked by hinged door 72 (FIG. 6) when the back 74 is secured to the housing.

The two shafts (24, 34) double knob (48, 50) arrangement is particularly advantageous in that it permits one knob to be rotated to move the band 18, while the other knob may be rotated the necessary amount, to take up any slack in the band.

FIG. 11 however shows a modified drive arrangement in which a drive shaft 76 is provided with a single operating knob 78. A drive gear 80 is secured to shaft 76 for driving gears 82 and 84 on shafts 22a and 34a. With this arrangement, it is therefore only necessary to rotate a single shaft to properly operate the time conversion device.

FIG. 12 shows another form of this invention in which the drive assembly shown in FIG. 11 is particularly adapted for automatic use. In this form of the invention, a conventional clock mechanism or timing device 80 is secured in a suitable manner to automatically operate drive shaft 76 so that band 18 is automatically moved in the same manner as a clock. Such an arrangement is particularly adaptable for airports or for use by ham operators and the like and may include luminous indicia on band 18 for easy visibility in dimly lit rooms. The luminous indicia may of course be provided on band 18 even when it is to be manually operated.

Referring again to FIG. 4 is is noted that between each hour indicia, other lines or suitable indicia 55 are provided to indicate, for example, the quarter hour, half hour, and three-quarter hour. Advantageously, band or tape 18 may be made of contrastingly colored light-passing transparent or translucent material with the printed matter or indicia being opaque. As a result a light may be provided behind band 18 and the light would pass through the colored tape or band without passing through its printed matter. This effects a "glow" to the colored band to highlight its printed matter. The "glowing" band not only serves as a striking attention-getter, but also assures that the indicia or printed matter will readily be seen.

Obviously, many modifications and variations of the present invention are possible in the light of the above teachings. It is, therefore, to be understood that within the scope of the appended claims the invention may be practiced otherwise than as specifically described.

In the claims:

1. A time conversion device comprising a substantially flat map having the international dateline indicated thereon, time conversion band means, time indicia on said band means, each of said time indicia being spaced from its adjacent indicia a distance equal to a time zone of said map, means for mounting said band means with a portion of said band means having prior time indicia entering the front of said map at said international dateline and extending across said map in an eastern direction, said band means extending around the front of said map from said international dateline to the eastern end of said map, then across the back of said map, said band means re-entering the front of said map at its western end and extending there across until the international dateline where said band means leaves the front of said map whereby said band means completely covers the front of said map with said international dateline being both a point of entry and a point of exit.

2. A device as set forth in claim 1 wherein said band means comprises a single band having at least three full 24 hour days including full days of yesterday and tomorrow.

3. A device as set forth in claim 1 wherein said mounting means includes drive means for changing the relative position of said band means with respect to said map.

4. A device as set forth in claim 3 wherein said map is divided into a northern portion and a southern portion, said northern portion being mounted to a first support plate, said southern portion being mounted on a second support plate, spacer means between said support plates, a slot in said spacer means at said international dateline, and said spacer means providing a track upon which said band means may be driven.

5. A device as set forth in claim 4 wherein said plates and said spacer means are disposed in a housing, and a storage compartment being in said housing.

6. A device as set forth in claim 4 wherein the back of said spacer means is flush with said plates, and the front of said spacer means being disposed slightly inwardly from said plates to accommodate said band means.

7. A time conversion device for use with a flat map having the international dateline indicated thereon comprising a track, a slot in said track corresponding to the location of the international dateline on the map, a time conversion band, time indicia on said time conversion band, each of said indicia being spaced from its adjacent indicia a distance equal to a time zone of the map, one end of said band being secured on the back of said track and extending through said slot, said band then extending across the front of said track to its eastern end thereof, and then completely across the back of said track to the western end of said track, and then across the front of said track to said slot with the opposite end of said band being inserted through said slot and being secured to the back of said track.

8. A device as set forth in claim 7 wherein said ends of said band are secured to drive means for changing the relative position of said band on said track, said drive means including a pair of shafts mounted on opposite sides of said slot and each end of said band being secured to a respective shaft.

9. In a time indicating device having a flat map with an international dateline and time zones, the improvement comprising a time conversion band for entering the map at its international dateline and for indicating the relative time at different locations on the map, time indicia at spaced intervals on said band, said time indicia including hour indicating means spaced apart a distance equal to a time zone of the map, said hour indicating means including a full twenty-four hours of today, a full twenty-four hours of tomorrow, a full twenty-four hours of yesterday, said time indicia further including word designations to distinguish the hours of today from the hours of yesterday and tomorrow, and each of said days being contrastingly colored.

References Cited by the Examiner

UNITED STATES PATENTS

| 2,001,633 | 5/1935 | Segovia | 58—42.5 |
| 3,226,926 | 1/1966 | Kilberg | 58—42.5 |

FOREIGN PATENTS 12,893  1915  Great Britain.

RICHARD B. WILKINSON, *Primary Examiner.*

GERALD F. BAKER, *Examiner.*